(12) United States Patent
Hulsey et al.

(10) Patent No.: US 11,152,830 B2
(45) Date of Patent: Oct. 19, 2021

(54) ISOLATED BOLTING CONNECTION FOR A GENERATOR

(71) Applicant: Siemens Energy, Inc., Orlando, FL (US)

(72) Inventors: David Earl Hulsey, Fort Payne, AL (US); William Green, Valley Head, AL (US); Robert Gore, Sorrento, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 16/259,051

(22) Filed: Jan. 28, 2019

(65) Prior Publication Data
US 2020/0244131 A1   Jul. 30, 2020

(51) Int. Cl.
*H02K 3/50* (2006.01)
*H01F 27/30* (2006.01)

(52) U.S. Cl.
CPC ........... *H02K 3/505* (2013.01); *H01F 27/306* (2013.01)

(58) Field of Classification Search
CPC ..... H02K 3/505; H01F 27/303; H01F 27/306; F16B 23/00; F16B 37/00; H02G 5/02
USPC .......................................... 310/71, 201, 260
See application file for complete search history.

(56) References Cited

U.S. PATENT DOCUMENTS

| | | | | |
|---|---|---|---|---|
| 808,241 A | * | 12/1905 | Jeannin | H02K 3/28 310/195 |
| 1,420,725 A | * | 6/1922 | Mattson | F16B 39/282 411/160 |
| 3,330,027 A | * | 7/1967 | Kernander | G01R 1/203 228/180.1 |
| 3,648,091 A | * | 3/1972 | Kostin | H02K 3/50 310/260 |
| 3,733,575 A | * | 5/1973 | Gottschalk | H01R 4/44 439/781 |
| 3,980,910 A | * | 9/1976 | Steinebronn | H01R 9/00 310/71 |

(Continued)

FOREIGN PATENT DOCUMENTS

| | | | | |
|---|---|---|---|---|
| CH | 000389084 | * | 3/1965 | ............. H02K 3/505 |
| DE | 000875381 | * | 5/1953 | ............. H02K 3/505 |

(Continued)

OTHER PUBLICATIONS

English machine translation, Daino, JP 2002118938 (Year: 2002).*

(Continued)

*Primary Examiner* — Burton S Mullins

(57) ABSTRACT

A connector assembly (12) for electrically and mechanically connecting via bolting, the top and bottom stator coil sections (14, 16) of an electrical generator comprising at least one pair of stator coil sections (14, 16) having spaced apart upper coil headers (18, 20) and lower coil headers (22, 24), each comprising a conductive material to provide at least two parallel paths for passing respective flows of electric current; first and second connectors (26, 28) including respective couplers (36, 38, 40, 42) for connecting the headers (18, 20, 22, 24), wherein the first and second connectors (26, 28) are electrically and mechanically isolated from one another via an air gap (34) therebetween so that none of the couplers (36, 38, 40, 42) bridge the air gap (34) and thereby allow relative movement between the first and second connectors (26, 28).

13 Claims, 4 Drawing Sheets

(56) References Cited

U.S. PATENT DOCUMENTS

| | | | | |
|---|---|---|---|---|
| 4,043,369 | A * | 8/1977 | Abernethy | F16B 39/282 411/277 |
| 4,056,880 | A * | 11/1977 | Stewart | H02K 3/24 29/596 |
| 4,072,873 | A * | 2/1978 | Nottingham | H02K 3/505 310/71 |
| 4,415,825 | A * | 11/1983 | Dailey | H02K 3/505 310/270 |
| 4,894,575 | A * | 1/1990 | Nilsson | H02K 3/505 310/260 |
| 6,958,561 | B2 | 10/2005 | Liao | |
| 7,321,179 | B2 * | 1/2008 | Ward | H01R 4/38 310/260 |
| 7,400,072 | B2 | 7/2008 | Ward | |
| 8,981,606 | B2 * | 3/2015 | Vitello | H02K 3/505 310/71 |
| 2012/0038241 | A1 * | 2/2012 | Zadeh | H02K 3/505 310/260 |

FOREIGN PATENT DOCUMENTS

| | | | | |
|---|---|---|---|---|
| DE | 001463928 | * | 3/1969 | H02K 3/505 |
| DE | 002425457 | * | 12/1975 | H02K 3/505 |
| DE | 102014220832 A1 | * | 4/2016 | F16B 39/282 |
| EP | 1860334 A1 | * | 11/2007 | F16B 37/14 |
| FR | 2852450 A1 | * | 9/2004 | H02B 1/044 |
| GB | 27641 | * | 4/1910 | H02K 3/505 |
| JP | S5565767 U | | 5/1980 | |
| JP | 2002118938 A | | 4/2002 | |

OTHER PUBLICATIONS

English machine translation, Forster et al., DE102014220832A1 (Year: 2016).*
English machine translation JP S55-65767 (Year: 1980).*
English translation of Baba, JP55-065767. (Year: 1980).*
PCT International Search Report and Written Opinion dated May 28, 2020 corresponding to PCT Application No. PCT/US2020/ 015138 filed Jan. 27, 2020.

* cited by examiner

```
┌─────────────────────────────────────────────────────────────────────────┐
│ Providing a first connector for connecting a first one of the upper coil headers to
│ a first one of the lower coil headers, the first connector comprising a first
│ connecting bar of a conductive material and at least a first pair of couplers for   ⟵ 94
│ electrically and mechanically connecting the first connector to the first one of the
│ upper coil header and the first one of the lower coil header at respective ends
└─────────────────────────────────────────────────────────────────────────┘
                                      ↓
┌─────────────────────────────────────────────────────────────────────────┐
│ Providing a second connector for connecting a second one of the upper coil headers
│ to a second one of the lower coil header, the second connector comprising a second
│ connecting bar of a conductive material and at least a second pair of couplers for
│ electrically and mechanically connecting the second connector to the first one of the  ⟵ 96
│ upper coil headers and a second one of the lower coil headers, wherein each of said
│ couplers comprises a fastener for passing through corresponding holes in the
│ header and connecting bar and a corresponding fastener receiving device
└─────────────────────────────────────────────────────────────────────────┘
                                      ↓
┌─────────────────────────────────────────────────────────────────────────┐
│ Assembling the first and second connectors to the coil headers with the couplers so
│ that the first and second connectors are electrically and mechanically isolated from
│ one another via an air gap therebetween, wherein none of the couplers bridge the air  ⟵ 98
│ gap and thereby allow relative movement between the first and second connectors
└─────────────────────────────────────────────────────────────────────────┘
```

ISOLATED BOLTING CONNECTION FOR A GENERATOR

TECHNICAL FIELD

The present invention relates to connectors for stator coils of electrical generators, and more particularly, to bolted connectors that can accommodate positional misalignment between stator coil sections to be electrically and mechanically joined.

BACKGROUND

In large electrical machinery, such as an electrical generator driven by a turbine in a power generating plant, the size and configuration of the generator typically requires that stator coils employed in the generator be arranged in physically separate coil sections or halves to facilitate installation and replacement of the coil sections. After installation in the generator, the coil sections need to be electrically and mechanically connected to one another at their ends. Similar connections may also be utilized between the ends of each phase coil and a parallel phase ring that may encircle the end of the generator stator windings. It is desired to make such connections in a manner that allows a degree of misalignment and with serviceability in mind.

SUMMARY

In an aspect of the invention, a connector assembly for electrically and mechanically connecting top and bottom stator coil sections of an electrical generator includes at least one pair of stator coil sections having spaced apart upper coil headers and lower coil headers, each comprising a conductive material to provide at least two parallel paths for passing respective flows of electric current. The assembly further includes a first connector for connecting a first one of the upper coil headers to a first one of the lower coil headers, the first connector comprising a first connecting bar of a conductive material and at least a first pair of couplers for electrically and mechanically connecting the first connector to the first one of the upper coil header and the first one of the lower coil header at respective ends. The assembly further includes a second connector for connecting a second one of the upper coil headers to a second one of the lower coil headers, the second connector comprising a second connecting bar of a conductive material and at least a second pair of couplers for electrically and mechanically connecting the second connector to the first one of the upper coil headers and a second one of the lower the lower coil headers, wherein the first and second connectors are electrically and mechanically isolated from one another via an air gap therebetween, wherein each of said couplers comprises a fastener for passing through corresponding holes in the header and connecting bar and a corresponding fastener receiving device for mechanically connecting the connecting bars to the respective coil headers so that none of the couplers bridge the air gap and thereby allow relative movement between the first and second connectors.

In another aspect, a method for electrically and mechanically connecting top and bottom stator coil sections of an electrical generator having at least one pair of stator coil sections having spaced apart upper coil headers and lower coil headers, each comprising a conductive material to provide at least two parallel paths for passing respective flows of electric current, the method includes providing a first connector for connecting a first one of the upper coil headers to a first one of the lower coil headers, the first connector comprising a first connecting bar of a conductive material and at least a first pair of couplers for electrically and mechanically connecting the first connector to the first one of the upper coil header and the first one of the lower coil header at respective ends. The method further includes providing a second connector for connecting a second one of the upper coil headers to a second one of the lower coil header, the second connector comprising a second connecting bar of a conductive material and at least a second pair of couplers for electrically and mechanically connecting the second connector to the first one of the upper coil headers and a second one of the lower the lower coil headers, wherein each of said couplers comprises a fastener for passing through corresponding holes in the header and connecting bar and a corresponding fastener receiving device. The method further includes assembling the first and second connectors to the coil headers with the couplers so that the first and second connectors are electrically and mechanically isolated from one another via an air gap therebetween, wherein none of the couplers bridge the air gap and thereby allow relative movement between the first and second connectors.

In another aspect, a low profile fastener receiving device for recessed installation in a member includes a shank portion for extending at least partially into the member, the shank portion configured for providing an interference fit within the member sufficient for locking the device against rotation therein, the shank portion further comprising an internally threaded portion for receiving a fastener therein; and a frusto-conical shaped flange portion for, upon installation, at least partially contacting a surface of the header at least around a perimeter of the flange portion and upon mating with the fastener to mechanically and electrically connect the connecting bar to a upper coil header, the flange portion configured to act as a disc spring for establishing, in conjunction with the fastener, urging the device against the surface of the header (18), a pre-load biasing force in a force plane against the header, sufficient to compensate for mechanical creep in a connection between the header and the connecting bar.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 7 is block diagram of an exemplary method of connecting stator coil sections of a generator stator.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A detailed description related to aspects of the present invention is described hereafter with respect to the accompanying figures.

As used in the following description, connection of coil ends refers to the connection of ends of coil halves or sections, as well as the connection of coil ends to phase rings. Further, the phase coil ends embrace both coil ends and the headers of the generator phase parallel ring. Thus, a connector embodying aspects of the present invention may be used on either of the above-described connecting applications.

Figure 1:
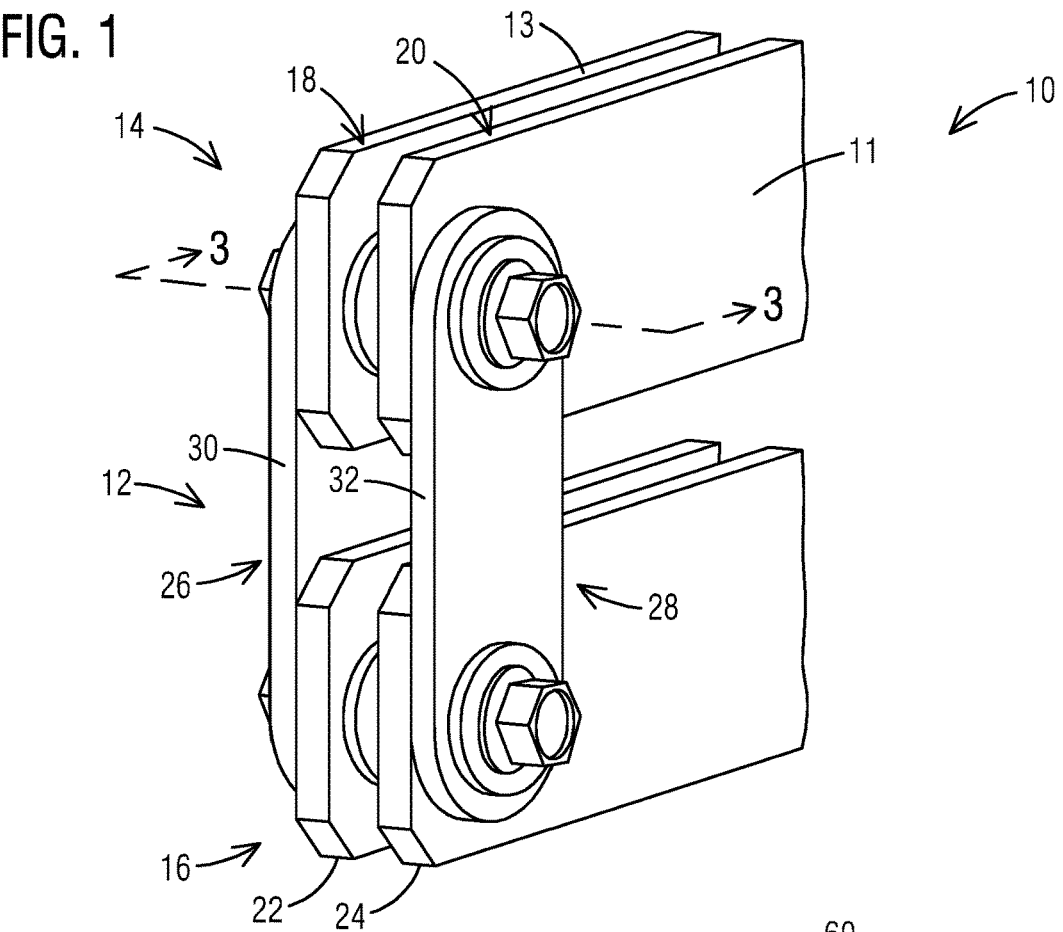
FIG. 1 is a perspective view of ends of a pair of exemplary stator coil sections of a generator stator illustrating a connector assembly (12) for connecting the ends according to an embodiment of the invention.

Turning first to FIG. 1, there is shown a perspective view of top and bottom stator coil sections 14, 16 of a generator stator 10, and an exemplary connector assembly 12 for connecting spaced apart upper coil headers 18, 20 and lower coil headers 22, 24 of the coil section 14, 16 in accordance with aspects of the present invention. As will be readily understood by one skilled in the art, these coils are components of generator stator 10, which in turn is part of a large electrical generator used, for example, in a power generating plant.

A top coil section 12, which may represent a first half of a coil loop, is shown as terminating in a top coil header 14. It will be appreciated that although FIG. 1 illustrates the top and bottom coil sections 12 and 18 as each comprising two separate Roebel bars 11, 13 such coil end sections need not be made up of separate Roebel bars since a singular Roebel bar construction could be employed.

In the past, coil ends have been electrically and mechanically connected using brazing. However, brazed connections, while providing a robust electrical and mechanical connection, have the drawback of requiring brazing on site during installation, which is expensive, time consuming, requires special skills, and carries certain risks. More recently, to allow for ease of assembly and improved serviceability, elaborate bolting schemes have been used, such as described in U.S. Pat. No. 8,981,606, wherein an insulated, single studs that passes through both coil headers on a given coil is used to make the connections. However, the bolting arrangement in the '606 patent may not be ideal. The Roebel bar headers on a given half coil end need to be electrically isolated from each other. In the '606 patent, the bolting hardware that passes between these headers is made from a conductive metal, so the desired electrical isolation requires the use of insulating sleeves and washers. These washers must be configured properly during assembly to function as intended. Stringent contact surface alignment requirements are necessary to allow sufficient electrical and mechanical contact for proper operation. The washers, spacers, and studs that comprise the bolting hardware are difficult to install because of the large number of components and the orientation that they must be held in during the assembly process. In addition, the insulating washers undergo mechanical creep at the elevated thermal and mechanical loads present during operation which may require increased routine maintenance. Furthermore, the existing bolting system increases the overall stiffness of the joint because the separate headers and Roebel bars to which they are connected of a given coil are mechanically coupled. This results in reduced coil header misalignment compliance and increased stress on the coils during assembly and operation.

The inventor of the present invention has innovatively created a connector arrangement that provides more easily serviceable series and phase connections between the coil ends and also advantageously reduces eddy current losses and/or skin effects. In one exemplary embodiment, this is achieved by providing a connecting structure that enables at least two parallel electrically conductive paths that are electrically insulated from one another for passing a respective flow of electric current between the coil ends.

The invention allows for a connector bar to be connected to a single header of a given half coil without requiring a bolting stud that passes all the way through both headers and connectors of the half coil. This is achieved by separate fasteners and fastener receivers for each header connection. Because the half coil headers are not coupled by a bolting stud, the insulating features from the standard configuration are not required. This substantially reduces the mechanical creep behavior of the connection over the design life, reduces the complexity of the joint and makes the joint faster and easier to assemble.

Figure 2:
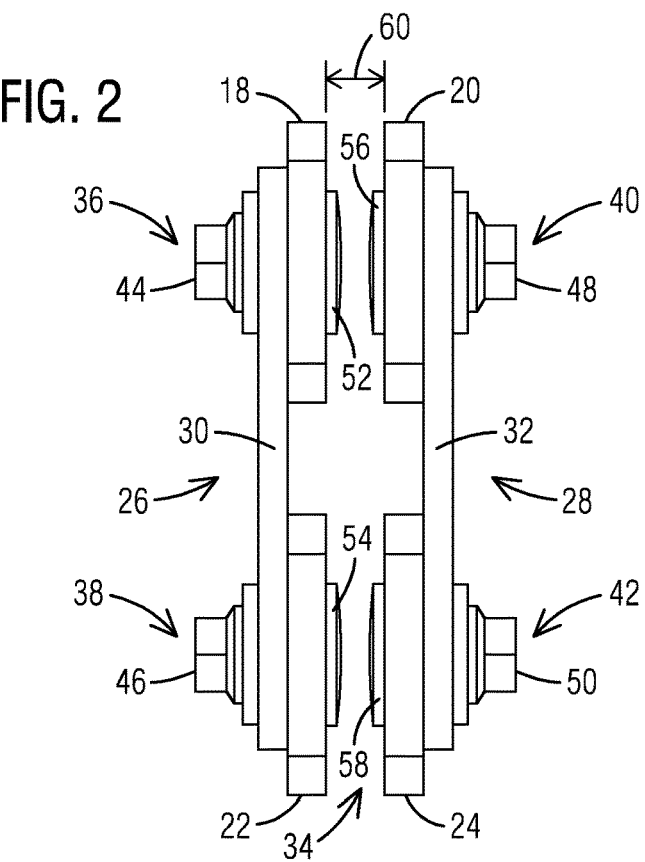
FIG. 2 is a front view of ends of a pair of exemplary stator coil sections of a generator stator of FIG. 1.
Figure 3:
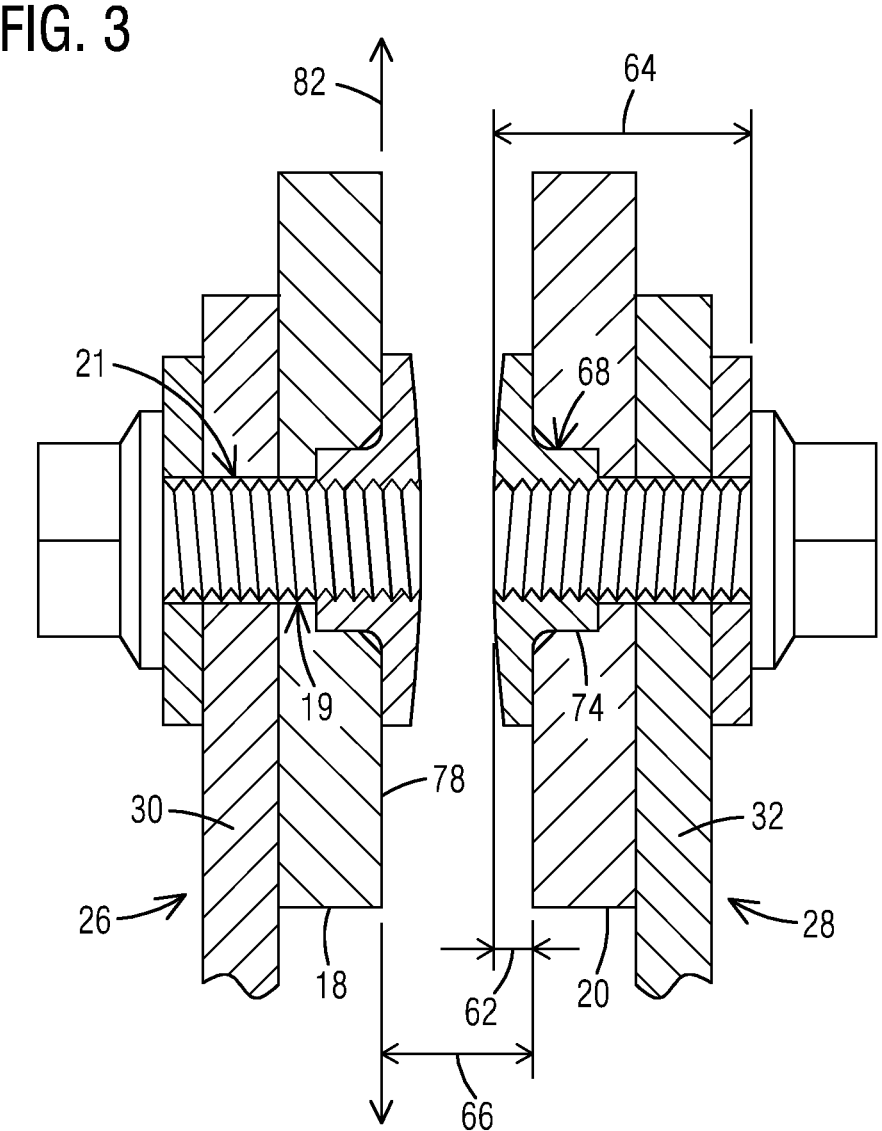
FIG. 3 is a partial cross-sectional view of the upper stator coil section taken along line 3-3 in FIG. 1.

In aspects of the invention shown in FIGS. 1-3, a connector assembly 12 for electrically and mechanically connecting top and bottom stator coil sections 14, 16 of an electrical generator may include at least one pair of stator coil sections 14, 16 having spaced apart upper coil headers 18, 20 and lower coil headers 22, 24. The coil sections 14, 16 may include a conductive material to provide at least two parallel paths for passing respective flows of electric current. A first connector 26 connects a first one of the upper coil headers 18 to a first one of the lower coil headers 22. The first connector 26 includes a first connecting bar 30 of a conductive material and at least a first pair of couplers 36, 38 for electrically and mechanically connecting the first connector 26 to the first one of the upper coil headers 18 and the first one of the lower coil headers 22 at respective ends.

A second connector 28 for connecting a second one of the upper coil headers 20 to a second one of the lower coil headers 24 is also provided. The second connector 28 includes a second connecting bar 32 of a conductive material and at least a second pair of couplers 40, 42 for electrically and mechanically connecting the second connector 28 to the first one of the upper coil headers 20 and a second one of the lower coil headers 24. In this configuration, the first and second connectors 26, 28 are advantageously electrically and mechanically isolated from one another via an air gap 34 therebetween;

In an aspect of the inventions, each of the couplers 36, 38, 40, 42 includes a fastener 44, 46, 48, 50 for passing through corresponding holes 19, 21 in the header e.g., 18 and connecting bar e.g., 30 and a corresponding fastener receiving device 52, 54, 56, 58 for mechanically connecting the connecting bars 30, 32 to the respective coil headers 18, 20, 22, 24 so that none of the couplers 36, 38, 40, 42 bridge the air gap 34. Isolated from each other, the coupler thereby allow relative movement between the first and second connectors 26, 28. This allows ease of assembly, increased coil header misalignment compliance, and decreased stress on the coils during assembly and operation.

In another aspect of the invention, the fastener e.g., 40 comprises a bolt having a length 64 sized to limit an extension distance into the air gap 34 so that sufficient mechanical, for example, to prevent interference, and electrical isolation, for example, to prevent arcing between the headers. The fastener receiving device 52 may include a relatively low profile for recessed installation in a member, such as the header 18, where access is limited or there is a need to keep a space, e.g., airgap 34, between an adjacent member such as header 20. For example, the fastener receiving device e.g., 52 has an exposed height 62 at least less than half of the width 66 of the airgap 34.

In another aspect of the invention, the fastener receiving device e.g., 52 includes a shank portion 70 for extending at least partially into the coil header e.g., 30. The shank portion 70 is configured for providing an interference fit 68 within the coil header e.g., 30 sufficient for locking the device e.g., 52 against rotation therein. The coil header e.g., 30 may include a recess 74, such as counterbore for at least partially receiving the shank portion 70 therein. The recess 74 may include any geometrical shape, such as a squared or tapered sides to provide the interference fit with a comparably-shaped mating shank portion 70 to lock rotation when installed.

In an example embodiment, the shank portion 70 comprises a plurality of raised structures 84 distributed around at least a portion of an outer periphery 86 configured to increase a frictional force between the shank portion 70 and coil header e.g., 30. The raised structures 84 comprise at least one of splines and knobs, such as may be provided by knurling, but any structure for prevent rotation relative to the connecting bar e.g., 30 may be used. The shank portion 70 may include an internally threaded portion 72 for receiving the fastener e.g., 40 therein.

Figure 4:
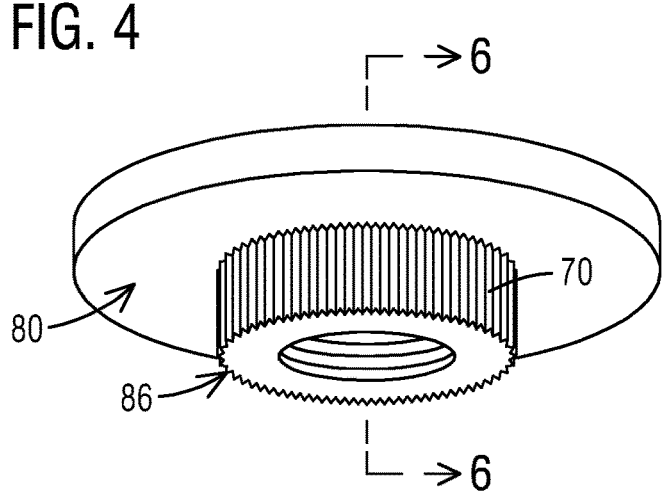
FIG. 4 is an upward perspective view of a receiving device according to an embodiment of the invention.
Figure 5:
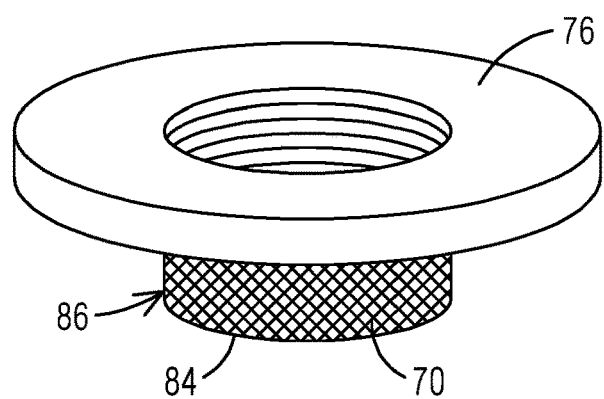
FIG. 5 is a downward perspective view of another embodiment of the receiving device of FIG. 4.
Figure 6:
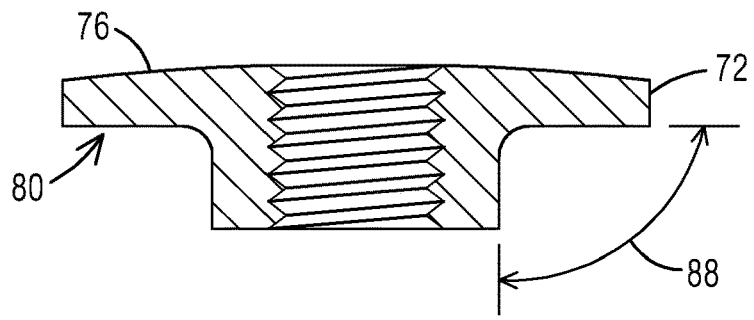
FIG. 6 is a cross sectional view of the receiving device of FIG. 4.

In another aspect of the invention depicted in FIGS. 4-5, the fastener receiving device e.g., 52 comprises a frusto-conical shaped flange portion 76 for, upon installation, at least partially contacting a surface 78 of the header 18 at least around a perimeter 80 of the flange portion 76 and upon mating with the fastener e.g., 36 to mechanically and electrically connect the connecting bar 30 to a upper coil header 18. The flange portion 76 may be configured to act as a disc spring for establishing, in conjunction with the fastener e.g., 36 urging the device e.g., 52 against the surface 78 of the header 18, a pre-load biasing force in a force plane 82 against the header 18. The biasing force may be configured to compensate for mechanical creep in a connection between the header 18 and the connecting bar 30. An appropriate material and/or angle 88 less than 90 degrees, such as between about 85 and 75 degrees, more specifically between about 84 to 80 degrees, and may be about 82 degrees, of the frusto-conical shape can be selected to impart the desired biasing force when assembled.

In another aspect of the invention depicted in the flow chart of FIG. 7, a method 92 for electrically and mechanically connecting top and bottom stator coil sections 14, 16 of an electrical generator having at least one pair of stator coil sections 14, 16 having spaced apart upper coil headers 18, 20 and lower coil headers 22, 24, each comprising a conductive material to provide at least two parallel paths for passing respective flows of electric current is shown. Such method may be used when manufacturing a generator and/or when servicing, repairing, or refurbishing a generator.

The method 92 includes providing 94 a first connector 26 for connecting a first one of the upper coil headers 18 to a first one of the lower coil headers 22, the first connector 26 comprising a first connecting bar 30 of a conductive material and at least a first pair of couplers 36, 38 for electrically and mechanically connecting the first connector 26 to the first one of the upper coil header 18 and the first one of the lower coil header 22 at respective ends 94.

The method 92 further includes providing 96 a second connector 28 for connecting a second one of the upper coil headers 20 to a second one of the lower coil header 24, the second connector 28 comprising a second connecting bar 32 of a conductive material and at least a second pair of couplers 40, 42 for electrically and mechanically connecting the second connector 28 to the first one of the upper coil headers 20 and a second one of the lower the lower coil headers 24, wherein each of said couplers 36, 38, 40, 42 comprises a fastener 44, 46, 48, 50 for passing through corresponding holes 19, 21 in the header e.g., 18 and connecting bar e.g., 30 and a corresponding fastener receiving device 53, 54, 56, 58.

The method 92 further includes assembling 98 the first and second connectors 26, 28 to the coil headers e.g., 22 with the couplers e.g., 44 so that the first and second connectors 26, 28 are electrically and mechanically isolated from one another via an air gap 34 therebetween none of the couplers 36, 38, 40, 42 bridge the air gap 34 and allow relative movement between the first and second connectors 26, 28.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A connector assembly for electrically and mechanically connecting top and bottom stator coil sections of an electrical generator comprising:

at least one pair of stator coil sections in the electrical generator having spaced apart upper coil headers and lower coil headers, each comprising a conductive material to provide at least two parallel paths for passing respective flows of electric current;

a first connector connecting a first one of the upper coil headers to a first one of the lower coil header, the first connector comprising a first connecting bar of a conductive material and at least a first pair of couplers that electrically and mechanically connects the first connector to the first one of the upper coil headers and the first one of the lower coil headers at respective ends;

a second connector connecting a second one of the upper coil headers to a second one of the lower coil header, the second connector comprising a second connecting bar of a conductive material and at least a second pair of couplers that electrically and mechanically connects the second connector to the first one of the upper coil headers and a second one of the lower the lower coil headers, wherein the first and second connectors are electrically and mechanically isolated from one another via an air gap therebetween;

wherein each of said couplers comprises a fastener for passing through corresponding holes in the respective coil header and the respective connecting bar and a corresponding fastener receiving device, and wherein the connecting are mechanically connected bars to the respective coil headers so that none of the couplers bridge the air gap and thereby allow relative movement between the first and second connectors.

2. The connector assembly of claim 1, wherein the fastener comprises a bolt having a length sized to limit an extension distance into the air gap.

3. The connector assembly of claim 1, wherein the fastener receiving device comprises an exposed height at least less than half of the width of the air gap.

4. The connector assembly of claim 1, wherein the fastener receiving device comprises a shank portion extending at least partially into the respective coil header the shank portion provides an interference fit within the coil header sufficient for locking the device against rotation therein.

5. The connector assembly of claim 4, wherein the respective coil header comprises a recess, wherein the shank portion is at least partially received therein.

6. The connector assembly of claim 4, wherein the shank portion comprises an internally threaded portion, wherein the fastener is received therein.

7. The connector assembly of claim 4, wherein the shank portion comprises a plurality of raised structures distributed around at least a portion of an outer periphery configured to increase a frictional force between the shank portion and connecting bar, and wherein the raised structures comprise splines.

8. The connector assembly of claim 4, wherein the shank portion comprises a plurality of raised structures distributed around at least a portion of an outer periphery configured to increase a frictional force between the shank portion and connecting bar, and wherein the raised structures comprise knobs.

9. The connector assembly of claim 1, wherein the fastener receiving device comprises a flange portion that at least partially contacts a surface of the respective coil header that mechanically and electrically connect the connecting bar to a upper coil header, the flange portion acts as a disc spring for establishing, in conjunction with the fastener, urging the device against the surface of the respective coil header.

10. The connector assembly of claim 1, wherein the fastener receiving device comprises a frust-conical shaped flange portion that at least partially contacts a surface of the respective coil header.

11. The method of claim 10, wherein the fastener receiving device comprises a frusto-conical shaped flange portion that at least partially contacts a surface of the respective coil header.

12. A method for electrically and mechanically connecting top and bottom stator coil sections of an electrical generator having at least one pair of stator coil sections having spaced apart upper coil headers and lower coil headers, each comprising a conductive material to provide at least two parallel paths for passing respective flows of electric current, the method comprising:

connecting a first one of the upper coil headers to a first one of the lower coil headers via a first connector, the first connector comprising a first connecting bar of a conductive material and at least a first pair of couplers that electrically and mechanically connects the first connector to the first one of the upper coil header and the first one of the lower coil header;

connecting a second one of the upper coil headers to a second one of the lower coil header via a second connector, the second connector comprising a second connecting bar of a conductive material and at least a second pair of couplers that electrically and mechanically connects the second connector to the first one of the upper coil headers and a second one of the lower the lower coil headers, wherein each of said couplers comprises a fastener for passing through corresponding holes in the header and connecting bar (e.g., 30) and a corresponding fastener receiving device;

wherein the first and second connectors are electrically and mechanically isolated from one another via an air gap therebetween, wherein none of the couplers bridge the air gap and thereby allow relative movement between the first and second connectors.

13. The fastener receiving device of claim 12, wherein an angle between the flange portion and shank portion is less than 90 degrees.

* * * * *